P. EVANS.
TIRE CASE.
APPLICATION FILED NOV. 1, 1907.
947,527.
Patented Jan. 25, 1910.
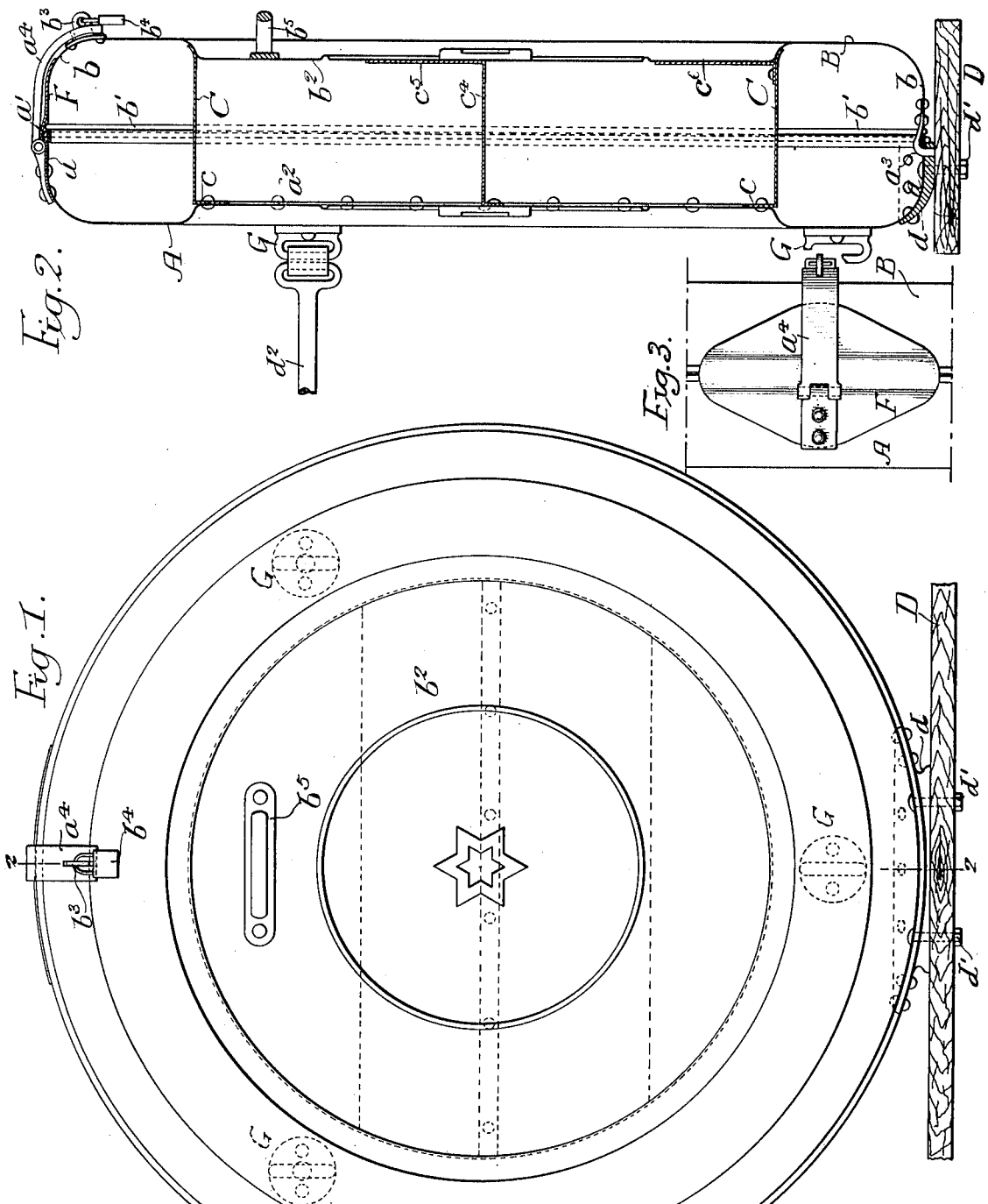

UNITED STATES PATENT OFFICE.

POWELL EVANS, OF PHILADELPHIA, PENNSYLVANIA.

TIRE-CASE.

947,527.　　Specification of Letters Patent.　　Patented Jan. 25, 1910.

Application filed November 1, 1907. Serial No. 400,254.

*To all whom it may concern:*

Be it known that I, POWELL EVANS, a citizen of the United States, residing in Philadelphia, Pennsylvania, have invented certain Improvements in Tire-Cases, of which the following is a specification.

One object of my invention is to provide a containing structure for the tire shoes or cases used on motor vehicles, which while being capable of effectually protecting these articles from exposure and the effects of the weather, shall also be so constructed as to permit of the utilization of all of the space within it for the purpose of carrying tools, etc.

I further desire to provide a case or container having the above characteristics which may be conveniently attached to a motor vehicle and which while providing a compartment for the reception of tire cases or shoes shall also provide a separate receptacle or receptacles within the first in which may be carried any desired article.

It is further desired that the device shall be of a substantial construction and at the same time relatively inexpensive to manufacture.

These and other advantageous ends I attain as hereinafter set forth, reference being had to the accompanying drawings, in which:

Figure 1, is a front elevation of my improved tire case, Fig. 2, is a vertical section on the line 2—2 Fig. 1, and Fig. 3, is a fragmentary plan of the central top part of the tire case.

In the above drawings A represents a metallic plate having a flange $a$ forming with a second plate B, which has a similar flange $b$, a flat cylindrical case or container.

It will be noted that the edge of the flange $a$ is turned outwardly and over to form a rounded bead as indicated at $a'$, while the adjacent edge of the flange $b$ of the member B is provided with an outwardly projecting circumferential rib $b'$ beyond which said flange extends so as to closely fit inside the flange of the member A. Both the members A and B have inwardly dished central portions $a^2$ and $b^2$ respectively. There is a third member C, also of sheet metal, constructed in the form of a cylinder open at both ends, one end, however, being provided with an inwardly extending flange $c$ while the other is preferably given a slight outward curve so as to smoothly fit against the inside surface of the member B, at that portion thereof which connects the dished portion $b^2$ with the remainder. The flange $c$ of this member C preferably engages the dished portion $a^2$ of the member A and is riveted or otherwise rigidly connected to it.

Extending horizontally across the inside of the member C at or adjacent to its central portion is a shelf or partition $c^4$ whose inner edge is flanged and riveted or otherwise attached to the inside face of the member A. The outer edge of this partition is upwardly extended as shown at $c^5$ in order to hold articles within the upper part of the container when the case is opened. Similarly there is an inwardly flanged piece $c^6$ riveted across the lower front edge of the member C to assist in retaining articles within the lower part of the box formed within said member.

The member B is removably connected to the member A by a hook $a^3$ which is fixed to said first member and enters a suitable hole in the latter member. In addition, there is provided an eye $b^3$ placed to be engaged by a hasp $a^4$ hinged to the member A, and said member also has a handle $b^5$ to facilitate the opening and closing of the case. A padlock $b^4$ may be placed in the eye so as to retain the hasp in position to hold together the two members of the container in their closed position and in order that there shall be no possibility of water entering at the top of the case I place a piece of leather F between the hasp and the top surface of the members A and B. This piece is extended on both sides of said hasp as shown in Fig. 3.

In the present instance the case as a whole is mounted upon the running or foot board D of the motor vehicle and this is provided with a casting or other suitable structure $d$ of concave form for the reception of the member A. Bolts $d'$, extending through the flange $a$ of said member and through the running board as well as the piece $d$, serve to hold the parts together, though in addition the member A is also riveted to the casting $d$.

Brackets $d^2$, fastened to the body of the vehicle in any desired manner, are so placed as to extend adjacent to the upper portion of the member A, to which are riveted fixtures G, which, with the ends of said brackets, are constructed for the reception of straps $g$ whereby they are connected together. There are preferably three of the fixtures G spaced equidistant upon the outside face of the member A. If desired, they may be used to strap the case in place upon the top of a vehicle when for any reason it is not advisable to mount it on the running board.

The construction and dimensions of the case are such that two shoes or tire cases can be carried in the annular space formed by the outer portions of the members A and B and the cylinder C, while the cylinder chamber formed by this latter member and the dished portions of the two members A and B may be conveniently divided and arranged as shown for the reception of tools, inner tubes, etc., as desired.

It will be noted that the cylindrical member C serves to receive and mechanically support the bodies of one or more tire cases or shoes, while its construction is such that the admission to its interior of sand, water or other deleterious substances such as oil, gasolene, etc., is a practical impossibility. At the same time ample ventilating space surrounds the rubber tires, aiding in their preservation.

While I have shown my tire case as formed of metal sheets, it is obvious that other materials may be used without departing from my invention.

I claim:

1. A tire case consisting of two dished pieces of sheet material, means for connecting and maintaining them together to form a container, a cylindrical structure in said container, a partition in said structure, and upwardly extending edge pieces for the said partition and the lower portion of the cylindrical structure.

2. A tire case consisting of two pieces of sheet material having flanges, and together forming a container, with a substantially cylindrical member in said container placed to divide the same into a cylindrical chamber and into an annular space for the reception of a tire or shoe, the central portions of said two pieces on each face of the case being depressed to cause the cylindrical chamber to be of less depth than the annular space.

3. The combination of two plates having their edges flanged toward each other so as to form a flat substantially cylindrical container, and a cylindrical member within the container fastened to one of said plates to form a cylindrical chamber and an annular space for the reception of the tire or shoe, said member being of a diameter to fit within and positively support the tire, and said plates being inwardly dished where they are joined by the ends of the cylindrical member so that the annular space has greater transverse width than that of said member.

4. The combination of two dished plates each having a cylindrical portion and together constructed to form a cylindrical container, with means for connecting the two members of said container, a flanged cylindrical member, and means for connecting the flange of said latter member to one of the plates adjacent to its dished portion so as to form a chamber and an annular space within said container.

5. The combination of two plates each having its edge flanged, and the flanges of said edges engaging one another to form a closed container whose parts separate in a plane at right angles to its axis, with means for maintaining said parts in position so that the container normally remains closed, said means including a pin in the flange of one plate movably fitting a recess in the flange of the other plate, and locking means connecting the plates at a portion of the container opposite that having said pin.

6. The combination of two flanged plates having their flanges meeting each other to form a closed container, a cylindrical structure mounted inside of the container and constructed to fit within and support a tire or tires within the container, and a partition extending in a plane substantially parallel with the axis of the container and rigidly fixed to the body portion of one of said plates within said cylindrical structure, said partition extending adjacent to the body portion of the other plate so as to form a plurality of chambers within said cylindrical structure.

7. A tire case consisting of two dished pieces of sheet material fitting together to form a container for a tire or tires, a substantially cylindrical member mounted within the container, and a partition placed within said member and having its ends bent at right angles to its body to provide a retaining edge, and means for its attachment to one of the dished pieces respectively.

8. A tire case consisting of two dished pieces of sheet material fitting together to form a container for a tire or tires, a substantially cylindrical member mounted within the container, a partition placed within said member for dividing the same into compartments, and an upwardly projecting edge section at the lower front portion of said member.

9. A tire case consisting of a relatively flat substantially cylindrical closed container of sheet material, a base structure attached to the container for maintaining it on edge and a fixture or fixtures on one face of the container whereby it may be held in an upright position.

10. The combination in a tire case of a relatively flat cylindrical container formed of two members separable on a plane at right angles to the axis of the container, a projection on one member placed to removably enter a recess in the other member, a hasp hinged to the member opposite said projection, and an eye on the other member placed to be engaged by said hasp.

11. The combination in a tire case of a relatively flat cylindrical container formed of two members of which one has a projection placed to enter a recess in the other member, a hasp hinged to the one member opposite said projection, and an eye placed on the other member to be engaged by said hasp, with a piece of leather placed between the hasp and its supporting member so as to extend over a portion of the other member.

12. A casing adapted to receive and inclose a tire, and means in the casing to prevent the tire from collapsing, said means providing a tool receiving compartment in the casing.

13. A casing adapted to receive and inclose a tire, means in the casing to prevent the tire from collapsing, said means providing a tool receiving compartment in the casing, and a shelf located in the tool receiving compartment.

14. A casing adapted to receive a tire, an annular member in the casing and adapted to prevent the tire from collapsing, and a shelf arranged within the annular member.

15. A casing adapted to receive a tire, an annular member in the casing and adapted to prevent the tire from collapsing, a shelf located within the member, and a guard located within the member.

16. A cylindrical casing adapted to receive and inclose a tire, one side of said casing being removable, means adapted to secure said side in applied position, and means in the casing to prevent the tire from collapsing.

17. A cylindrical casing adapted to receive and inclose a tire, means in the casing to prevent the tire from collapsing, and a shelf located in the casing within said means.

18. A cylindrical casing adapted to receive and inclose a tire, means in the casing to prevent the tire from collapsing, a shelf located in the casing within said means, and a guard located in the casing within said means.

19. A casing adapted to receive a tire, an annular member in the casing, and a shelf located within the annular member.

In testimony whereof, I have signed my name to this specification, in the presence of two subscribing witnesses.

POWELL EVANS.

Witnesses:
CLAYTON NEWBOLD,
JOHN J. JACKSON.